United States Patent
Culling et al.

(10) Patent No.: US 11,226,418 B2
(45) Date of Patent: Jan. 18, 2022

(54) SYSTEM AND METHOD FOR CALCULATING PROTECTION LEVELS FOR VELOCITY AND COURSE OVER GROUND

(71) Applicant: NovAtel Inc., Calgary (CA)

(72) Inventors: Brandon Culling, Calgary (CA); Lance de Groot, Calgary (CA)

(73) Assignee: NovAtel Inc., Calgary (CA)

( * ) Notice: Subject to any disclaimer, the term of this patent is extended or adjusted under 35 U.S.C. 154(b) by 245 days.

(21) Appl. No.: 16/445,743

(22) Filed: Jun. 19, 2019

(65) Prior Publication Data

US 2020/0400841 A1   Dec. 24, 2020

(51) Int. Cl.
| | |
|---|---|
| G08B 21/00 | (2006.01) |
| G01S 19/52 | (2010.01) |
| G01S 19/13 | (2010.01) |
| G01S 19/39 | (2010.01) |

(52) U.S. Cl.
CPC .............. G01S 19/52 (2013.01); G01S 19/13 (2013.01); G01S 19/396 (2019.08)

(58) Field of Classification Search
CPC .......... G01S 19/52; G01S 19/13; G01S 19/14; G01S 19/20; G01S 19/23; G01S 19/39; G06F 17/16
USPC ...................................... 342/357.35
See application file for complete search history.

(56) References Cited

U.S. PATENT DOCUMENTS

| | | | |
|---|---|---|---|
| 2009/0182495 A1 | 7/2009 | McDonald | |
| 2011/0291887 A1* | 12/2011 | Pulford | G01S 19/20 342/357.58 |
| 2012/0146851 A1* | 6/2012 | Fernandez | G01S 19/02 342/357.58 |

FOREIGN PATENT DOCUMENTS

EP    1729145    12/2006

OTHER PUBLICATIONS

Brown et al., "GPS RAIM: Calculation of Threshold and Protection Radius Using Chi-Square Methods—A Geometric Approach" Volpe Center, RSPA, U.S. Dept. of Transportation, Cambridge, MA, Sep. 1997, 24 pages.
Walter et al., "Weighted RAIM for Precision Approach" Jan. 1996, 10 pages.

(Continued)

*Primary Examiner* — Mark S Rushing
(74) *Attorney, Agent, or Firm* — Cesari and McKenna, LLP (57) ABSTRACT

In an example embodiment, a GNSS receiver may calculate protection levels for velocity and course over ground computed at a GNSS receiver. Specifically, the GNSS receiver may obtain Doppler measurements and variance measurements based on satellite signals received from at least five GNSS satellites. The GNSS receiver may utilize a least squares method to calculate the velocity states (e.g., x-velocity state, y-velocity state, and z-velocity state) and the clock bias for the GNSS receiver. The GNSS receiver may calculate the slope for each Doppler measurement on each velocity state. The GNSS receiver may then select the maximum slope for each velocity state and scale up the maximum slopes by a non-centrality parameter to calculate the protection level for each velocity state in the ECEF frame. The GNSS receiver may convert the velocity protection levels to NEU velocity protection levels to then calculate a protection level for course over ground.

20 Claims, 6 Drawing Sheets

(56) References Cited

OTHER PUBLICATIONS

Margaria Davide et al., A novel local integrity concept for GNSS receivers in urban vehicular contexts, 2014 IEEE/ION Position, Location and Navigation Symposium—Plans 2014, IEEE, May 5, 2014, pp. 413-425.
Crespillo O Garcia et al., GNSS-aided INS Integrity Concept, GNSS 2014—Proceedings of hte 27th International Technical Meeting of the Satellite Division of the Institute of Navigation, Manassas, VA, Sep. 12, 2014, pp. 2069-2077.
European Search Report dated Nov. 9, 2020 for European Patent Application No. 20178979.9 for NovAtel Inc., 11 pages.

* cited by examiner

SYSTEM AND METHOD FOR CALCULATING PROTECTION LEVELS FOR VELOCITY AND COURSE OVER GROUND

BACKGROUND

Technical Field

The invention relates generally to global navigation satellite systems (GNSS), and in particular, to a system and method for calculating protection levels for velocity and course over ground computed at a GNSS receiver.

Background Information

In traditional approaches, the calculated standard deviation of velocity may represent a quality estimate of the accuracy of the velocity. However, the standard deviation only provides a 68% reliability in the accuracy of the velocity. As such, emerging automotive sub-systems, such as an automated driving system (ADS) and an advanced driver assistance system (ADAS), which typically require reliability on the order of 99% or greater, cannot use the velocity and/or other related values (e.g., course over ground) computed/obtained at the GNSS receiver.

SUMMARY

Techniques are provided for calculating protection levels for velocity and course over ground. In an embodiment, a global navigation satellite system (GNSS) receiver utilizes phase range rate measurements (Doppler measurements) and variance measurements to calculate protection levels for velocity (i.e., estimated velocity) and course over ground computed at a GNSS receiver.

Specifically, the GNSS receiver may receive satellite signals from at least five GNSS satellites. The GNSS receiver may then obtain, in a known manner, Doppler measurements (i.e., observations) based on the reception of the satellite signals. The GNSS receiver may also obtain, in a known manner and based on the reception of the satellite signals, variance measurements that indicate an accuracy of measure on each of the Doppler measurement.

The GNSS receiver may compute a weight (W) matrix based on the variance measurements. Specifically, the W matrix may be a diagonal matrix that includes the inverse of the variance measurements. The GNSS receiver may compute a shaping (G) matrix that represents the relationship between the Doppler measurements and the velocity computed at the GNSS receiver. The G matrix may be a computation of the direction cosine of each GNSS satellite that transmits satellite signals from which that the GNSS receiver 104 obtains the Doppler measurements.

The GNSS receiver may utilize a least squares method with the W matrix, the G matrix, and the Doppler measurements (e.g., a D×1 sized matrix, where D equals the number of Doppler measurements) to calculate the velocity states (e.g., x-velocity state, y-velocity state, and z-velocity state) and the clock bias for the GNSS receiver. The GNSS receiver may compute the slope for each Doppler measurement on each velocity state and the clock bias, where the slopes computed for a particular Doppler measurement indicates how strongly the particular Doppler measurement affects each velocity state and clock bias.

The GNSS receiver may then select the maximum slope for each velocity state (e.g., x-velocity state, y-velocity state, and z-velocity state) and clock bias, where the maximum slope is associated with the Doppler measurement that most strongly affects the velocity state and clock bias. The GNSS receiver may select a non-centrality parameter from a table based on a redundancy value (e.g., number of Doppler measurements—four unknowns), where the table may be generated utilizing a known chi squared distribution approach.

The GNSS receiver may calculate a protection level for each velocity state in the earth-centered, earth-fixed (ECEF) frame by scaling up the maximum slope for each velocity state based on the selected non-centrality parameter. The GNSS receiver may convert the velocity protection levels calculated in the ECEF frame to north, east, and up (NEU) velocity protection levels utilizing a rotation matrix that is computed based on the position (e.g., longitude and latitude) of the GNSS receiver. The GNSS receiver may transform the north and east velocity protection levels into a course over ground protection level utilizing north velocity, east velocity, the protection level for the north velocity, and the protection level for the east velocity.

The GNSS receiver may then transmit one or more of the protection levels (e.g., north, east, up, and course over ground protection levels) to a sub-system, such as an automated driving system (ADS) or an advanced driver assistance system (ADAS). The sub-system may compare the protection levels to one or more alert limits to determine whether the velocity and/or course over ground values computed at the GNSS receiver can be utilized by the sub-system. When the protection level, associated with a particular value (e.g., velocity or course over ground) computed at the GNSS receiver, does not exceed the alert limit, the sub-system may utilize the particular value in the safety critical environment. Advantageously, sub-systems that typically require reliability on the order of 99% or greater in the accuracy of a computed value may utilize velocity and/or course over ground when the protection levels, calculated according to the one or more embodiments described herein, do not exceed the alert limit.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
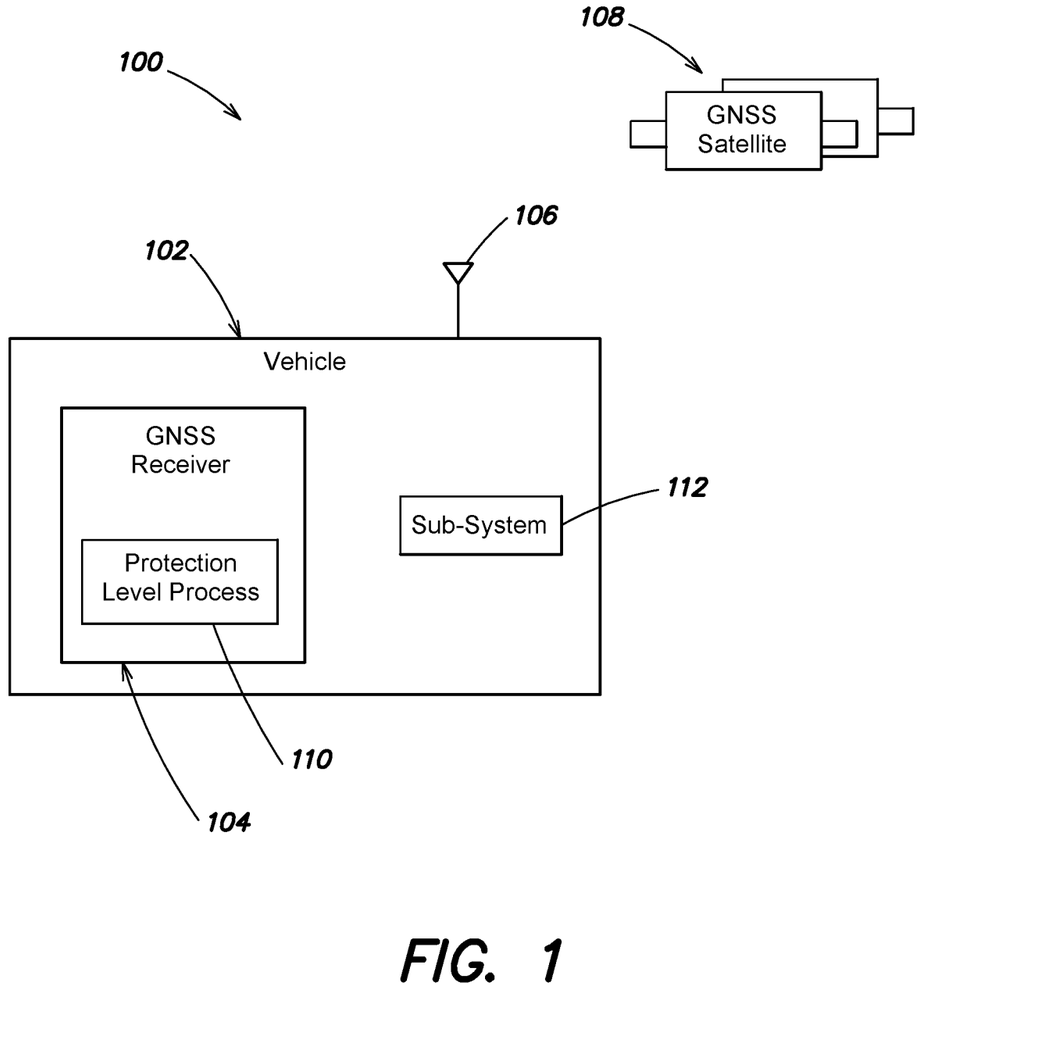
FIG. 1 illustrates a system according to one or more embodiments described herein.

Referring to FIG. 1, a system 100 includes a vehicle 102 capable of moving that includes a global navigation satellite system (GNSS) receiver 104 and an antenna 106. The antenna 106 may receive one or more satellite signals from one or more GNSS satellites 108. For example, the antenna 106 may receive satellite signals from at least five GNSS satellites 108. The GNSS receiver 104 may, based on the reception of the satellite signals at the antenna 106, compute position, velocity, course over ground, and/or other related values.

In addition, the GNSS receiver 104 includes protection level process 110 that implements one or more embodiments described herein. The protection level process 110 may be hardware, software, or a combination thereof. The vehicle 102 may further include one or more sub-systems 112. For example, the sub-system 112 may be an automated driving system (ADS) or an advanced driver assistance system (ADAS), which typically requires reliability on the order of 99% or greater in the accuracy of a computed value such that the computed value can be used by the sub-system 112 in a safety critical environment. The sub-system 112 may receive the protection levels for velocity and/or course over ground, determined according to one or more embodiments described herein, and compare the protection levels to one or more alert limits to determine whether the velocity and/or course over ground values can be utilized by the sub-system 112 in a safety critical environment. The GNSS receiver 104 and sub-system 112 in system 100 may include processors, memory, storage, and other hardware (not shown).

Figure 2A:
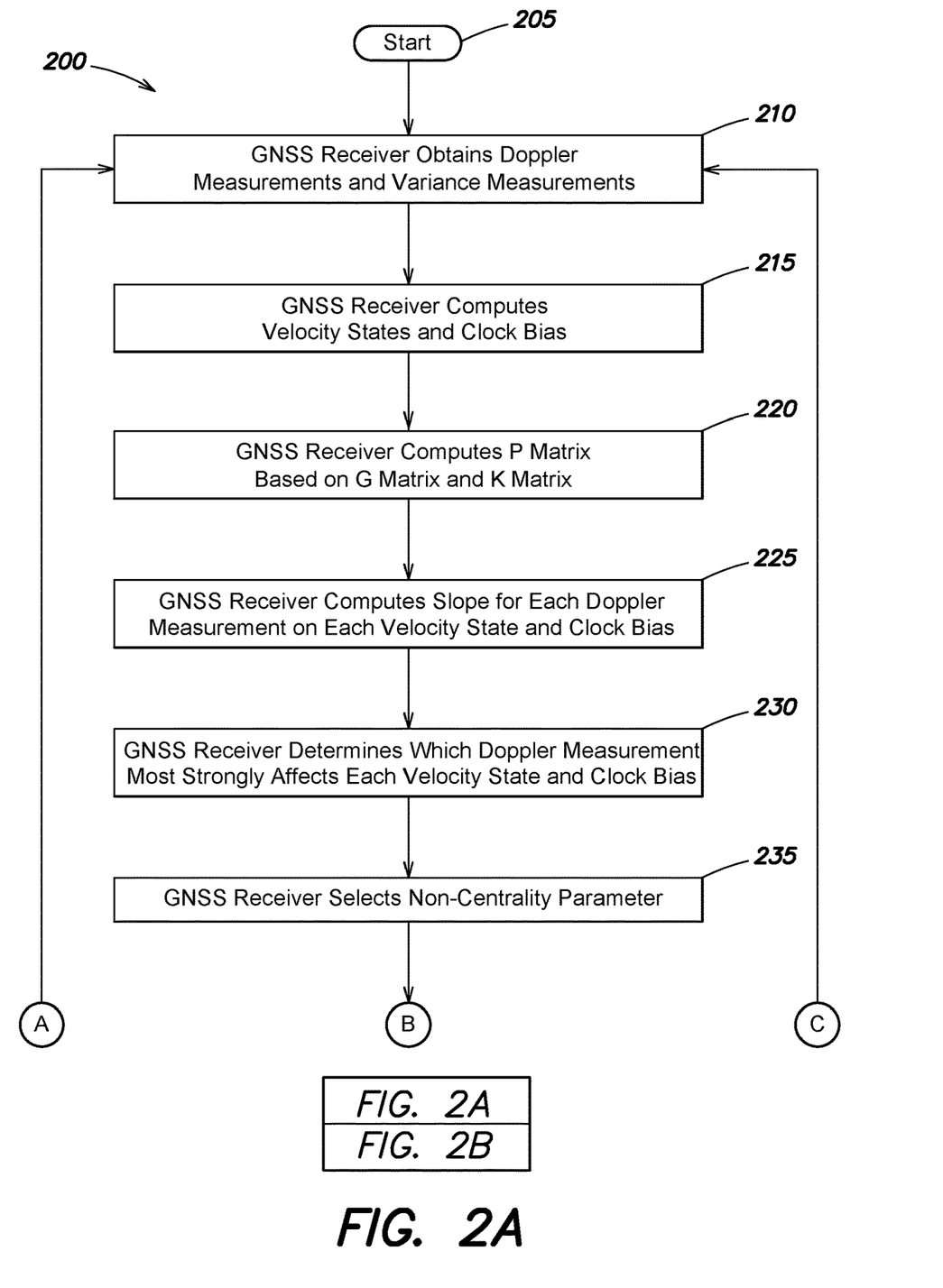
FIGS. 2A and 2B are a flow diagram for calculating and utilizing protection levels for velocity and course over ground according to one or more embodiments described herein.
Figure 2B:
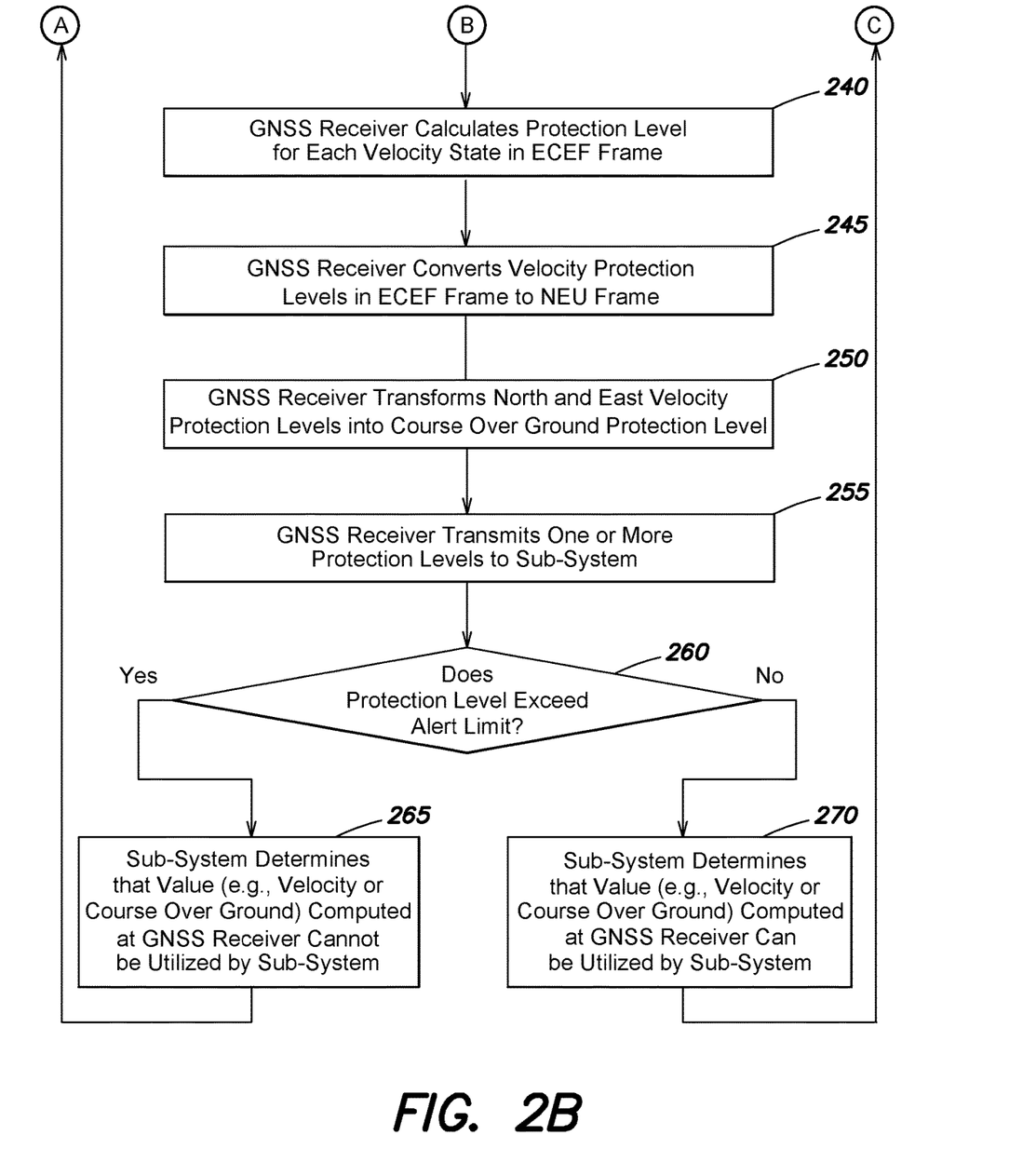

FIGS. 2A and 2B are a flow diagram of a sequence of steps for calculating and utilizing protection levels for velocity and course over ground according to one or more embodiments described herein. For simplicity purposes, the example values utilized herein may be rounded to a particular number of decimal digits, e.g., three decimal digits. However, it is expressly contemplated that the one or more embodiments described herein may be implemented using values that are rounded to any number of decimal digits. For example, the values described herein may be rounded to 8 decimal digits or greater to obtain higher precision.

The procedure 200 starts at step 205 and continues to step 210 where the GNSS receiver 104 obtains Doppler measurements and variance measurements. Specifically, the antenna 106 may receive satellites signals from at least five GNSS satellites 108. In an embodiment, the antenna 106 receives satellites signals from 15 to 20 GNSS satellites 108. The GNSS receiver 104, in a known manner, may obtain Doppler measurements based on the satellite signals received at the antenna 106 at a particular point in time. For example, if the antenna 106 receives satellite signals from six GNSS satellites 108 at a first point in time, the GNSS receiver 104, in a known manner, obtains six Doppler measurements, each of which corresponds to a different GNSS satellite 108. The GNSS receiver also obtains, in a known manner, variance measurements for each of the obtained Doppler measurements. In addition, the GNSS receiver may, in a known manner, compute position, velocity, and course over ground, etc.

As an example, let it be assumed that the antenna 106 receives satellites signals from six GNSS satellites 108. Although the example described herein refers to receiving satellite signals from six GNSS satellites 108, it is expressly contemplated that the one or more embodiments described herein may be implemented utilizing satellite signals received from any number of GNSS satellites 108 that is greater than or equal to five. In this example and based on the reception of the satellite signals from the six GNSS satellites 108, the GNSS receiver 104 obtains six Doppler measurements to form the following Doppler measurements matrix:

$$\text{Doppler measurements matrix} = \begin{bmatrix} 18.607 \\ -28.058 \\ 1.543 \\ -7.592 \\ -5.102 \\ -15.292 \end{bmatrix}.$$

The Doppler measurements matrix is a D×1 sized matrix that includes the Doppler measurements, where D equals the number of Doppler measurements obtained by the GNSS receiver 104. Each Doppler measurement in the Doppler measurements matrix corresponds to a different GNSS satellite. The first Doppler measurement corresponds to the satellite signals received from a first GNSS satellite, the second Doppler measurement corresponds to the satellite signals received from a second GNSS satellite, the third Doppler measurement corresponds to the satellite signals received from a third GNSS satellite, the fourth Doppler measurement corresponds to the satellite signals received from a fourth GNSS satellite, the fifth Doppler measurement corresponds to the satellite signals received from a fifth GNSS satellite, and the sixth Doppler measurement corresponds to the satellite signals received from a sixth GNSS satellite.

In addition, and based on the reception of the satellite signals, the GNSS receiver 104 obtains six variance measurements ($\sigma^2$) to form the following $\sigma^2$ matrix:

$$\sigma^2 \text{matrix} = \begin{bmatrix} 0.098 \\ 0.039 \\ 0.110 \\ 0.028 \\ 0.020 \\ 0.076 \end{bmatrix}.$$

The $\sigma^2$ matrix is a D×1 sized matrix, where D equals the number of Doppler measurements obtained by the GNSS receiver 104. Each of the variance measurements in the $\sigma^2$ matrix corresponds to a different Doppler measurement. Specifically, the first variance measurement corresponds to the first Doppler measurement, the second variance measurement corresponds to the second Doppler measurement, and so forth.

The procedure continues to step 215 and the GNSS receiver 104 computes the velocity states and the clock bias. Specifically, the protection level process 110 computes a weight (W) matrix that includes the inverse of the variance measurements in the $\sigma^2$ matrix, where the W matrix is a diagonal matrix that includes a number of rows and columns that is equal to the number of Doppler measurements. Therefore, and in this example, the W matrix is a 6×6 sized matrix. Each value in the diagonal entry of the W matrix is the inverse of the corresponding variance measurement in the $\sigma^2$ matrix. For example, the value at entry 1, 1 of the W matrix is 10.204 which is the inverse of the first variance measurement of 0.098. Similarly, the value at entry 2, 2 of the W matrix is 25.641 which is the inverse of the second variance measurement of 0.039. The other values at the other entries (e.g., 3, 3; 4, 4; 5, 5; and 6, 6) are computed in a similar manner. The remaining, e.g., off-diagonal, entries of the W matrix are zeros. In this example, the protection level process 110 computes the W matrix that is a 6×6 sized matrix and includes the following entry values:

$$W \text{ matrix} = \begin{bmatrix} 10.204 & 0.0 & 0.0 & 0.0 & 0.0 & 0.0 \\ 0.0 & 25.641 & 0.0 & 0.0 & 0.0 & 0.0 \\ 0.0 & 0.0 & 9.091 & 0.0 & 0.0 & 0.0 \\ 0.0 & 0.0 & 0.0 & 35.714 & 0.0 & 0.0 \\ 0.0 & 0.0 & 0.0 & 0.0 & 50 & 0.0 \\ 0.0 & 0.0 & 0.0 & 0.0 & 0.0 & 13.158 \end{bmatrix}.$$

The protection level process 110 also computes a shaping (G) matrix that represents the relationship between the Doppler measurements and the velocity computed at the GNSS receiver 104. Specifically, the G matrix may be a computation of the direction cosine of each GNSS satellite. Specifically, the G matrix is:

$$G \text{ matrix} = \begin{bmatrix} \frac{X_{Sat0} - X_{Rx}}{Range_{Sat0toRx}} & \frac{Y_{Sat0} - Y_{Rx}}{Range_{Sat0toRx}} & \frac{Z_{Sat0} - Z_{Rx}}{Range_{SatntoRx}} & 1 \\ \vdots & \vdots & \vdots & \vdots \\ \frac{X_{Satn} - X_{Rx}}{Range_{SatntoRx}} & \frac{Y_{Satn} - Y_{Rx}}{Range_{SatntoRx}} & \frac{Z_{Satn} - Z_{Rx}}{Range_{SatntoRx}} & 1 \end{bmatrix},$$

where $X_{Sat0}$ is the x coordinate of the first GNSS satellite (e.g., the first GNSS satellite that transmits satellite signals such that the GNSS receiver 104 obtain the Doppler measurement of 18.607), $X_{Rx}$ is the x coordinate of the GNSS receiver 104, $Y_{Sat0}$ is the y coordinate of the first GNSS satellite, $Y_{Rx}$ is the y coordinate of the GNSS receiver 104, $Z_{Sat0}$ is the z coordinate of the first GNSS satellite, $Z_{Rx}$ is the z coordinate of the GNSS receiver 104, $X_{Satn}$ is the x coordinate of the last GNSS satellite (e.g., the sixth GNSS satellite that transmits satellite signals such that the GNSS receiver obtains the Doppler measurement of −15.292), $Y_{Satn}$ is the y coordinate of the last GNSS satellite, and $Z_{Satn}$ is the z coordinate of the last GNSS satellite. In addition, $Range_{Sat0toRx}$ is formed from the coordinates of the first satellite and the coordinates of the GNSS receiver, where $Range_{Sat0toRx} = \sqrt{(X_{Sat0}-X_{Rx})^2+(Y_{Sat0}-Y_{Rx})^2+(Z_{Sat0}-Z_{Rx})^2}$. Similarly, $Range_{SatntoRx} = \sqrt{(X_{Satn}-X_{Rx})^2+(Y_{Satn}-Y_{Rx})^2+(Z_{Satn}-Z_{Rx})^2}$.

Thus, the protection level process 110 utilizes the x, y, and z coordinates of all of the GNSS satellites 108 and the x, y, and z coordinates of the GNSS receiver 104 to compute the G matrix. In this example, the G matrix is a 6×4 sized matrix and includes the following entry values:

$$G \text{ matrix} = \begin{bmatrix} 0.459 & -0.716 & -0.526 & 1.0 \\ 0.472 & 0.823 & 0.315 & 1.0 \\ 0.881 & -0.442 & -0.168 & 1.0 \\ 0.947 & 0.157 & -0.281 & 1.0 \\ 0.237 & 0.694 & -0.680 & 1.0 \\ -0.536 & 0.813 & 0.228 & 1.0 \end{bmatrix}.$$

For a linear system, and as known by those skilled in the art, y=G*x+e, where y is the Doppler measurement, x is the velocity states and clock bias, G is the shape matrix, and e is noise. As such, the GNSS receiver 104 may utilize a least squares method, and specifically, $$x = \text{Inv}(G^T*W*G)*G^T*W*y = Ky,$$

to solve for K (e.g., a matrix including the velocity states and the clock bias), where $G^T$ is the transpose of the G matrix, W is the W matrix, G is the G matrix, and y is Doppler measurements matrix. Therefore, the protection level process 110 may solve for K (transformation matrix) to compute the velocity states and clock bias for the GNSS receiver 104. In this example and based on the values of the G matrix, the W matrix, and Doppler measurements matrix, the protection level process 110 solves for K that is a 4×6 sized matrix and includes the following entry values:

$$K \text{ matrix} = \begin{bmatrix} -0.312 & 0.293 & 0.001 & 0.075 & -0.136 & -0.601 \\ -0.510 & 0.356 & -0.261 & 0.073 & 0.531 & -0.189 \\ -0.016 & 0.649 & 0.112 & 0.032 & -1.092 & 0.316 \\ 0.420 & 0.078 & 0.204 & -0.107 & -0.119 & 0.524 \end{bmatrix},$$

where the first row corresponds to the x-velocity, the second row corresponds to the y-velocity, the third row corresponds to the z-velocity, the fourth row corresponds to the clock bias, the first column corresponds to the first Doppler measurement, the second column corresponds to the second Doppler measurement, the third column corresponds to the third Doppler measurement, the fourth column corresponds to the fourth Doppler measurement, the fifth column corresponds to the fifth Doppler measurement, and the sixth column corresponds to the sixth Doppler measurement.

The procedure continues to step 220 and the GNSS receiver 104 computes a P matrix based on the G matrix and the K matrix. Specifically, the protection level process 110 multiplies the G matrix (6×4) with the K matrix (4×6) to compute the P matrix. In this example, the P matrix includes the following entry values.

$$P \text{ matrix} = \begin{bmatrix} 0.650 & -0.383 & 0.332 & 0.171 & 0.013 & 0.217 \\ -0.153 & 0.714 & 0.025 & 0.320 & -0.091 & 0.184 \\ 0.373 & 0.070 & 0.301 & 0.521 & -0.290 & 0.025 \\ 0.049 & 0.230 & 0.133 & 0.611 & 0.142 & -0.164 \\ 0.003 & -0.047 & -0.053 & 0.101 & 0.960 & 0.036 \\ 0.168 & 0.359 & 0.017 & -0.444 & 0.136 & 0.764 \end{bmatrix}.$$

The procedure continues to step 225 and the GNSS receiver 104 computes a slope for each Doppler measurement on each velocity state and clock bias. Specifically, the protection level process 110 computes the slope for each Doppler measurement utilizing:

$$\text{Slope}_i = \text{abs}(K_{ji})*\sigma_i/\sqrt{(1-P_{ii})},$$

where Slopei is the slope (i.e., impact) of the i Doppler measurement, Kji is the entry value from the K matrix for the i Doppler measurement and j state, σi is the square root of the entry value from the σ² matrix of the i Doppler measurement, and Pii is the diagonal entry value from the P matrix for the i Doppler measurement.

Therefore, the protection level process 110 computes a slope (i.e., impact) for each Doppler measurement on each velocity state and the clock bias. The protection level process 110 may then form a Slopei matrix that is a D×4 sized matrix, where D is equal to the number of Doppler measurements. Each row of the Slopei matrix corresponds to a different Doppler measurement and the first, second, third, and fourth columns respectively correspond to the x-velocity, y-velocity, z-velocity, and clock bias. The values stored at each entry of the Slopei matrix represent the impact a particular Doppler measurement has on a particular velocity state or clock bias.

Therefore, and continuing with the example, the protection level process 110 computes the slope for the first Doppler measurement on the x-velocity to be 0.165 (abs(−0.312)*0.313/√(1−0.650)). In addition, the GNSS receiver 104 computes the slope for the first Doppler measurement on the y-velocity to be 0.270 (abs(−0.510)*0.313/√(1−0.650)). Further, the GNNS receiver computes the slope for the first Doppler measurement on the z-velocity to be 0.008 (abs(−0.016)*0.313/√(1−0.650)). Moreover, the GNSS receiver computes the slope for the first Doppler measurement on the clock bias to be 0.222 (abs(0.420)*0.313/√(1−0.650)). The slopes computed by the protection level process 110 for the first Doppler measurement represent how strongly (i.e., impact) the first Doppler measurement has on each velocity state and the clock bias. Each slope computed for the first Doppler measurement on each velocity state and the clock bias is stored in a corresponding column of the first row of the Slopei matrix. The GNSS receiver 104 computes the slope for each other Doppler measurement on each of the velocity states and the clock bias in a similar manner to form the Slopei matrix. In this example, the Slopei matrix includes the following entry values:

$$\text{Slopei matrix} = \begin{bmatrix} 0.165 & 0.270 & 0.008 & 0.222 \\ 0.108 & 0.131 & 0.240 & 0.029 \\ 0.000 & 0.104 & 0.044 & 0.081 \\ 0.203 & 0.020 & 0.009 & 0.029 \\ 0.096 & 0.375 & 0.772 & 0.084 \\ .341 & 0.107 & 0.179 & 0.297 \end{bmatrix}.$$

The first row of the Slopei matrix corresponds to the impact the first Doppler measurement has on the x-velocity (first column), y-velocity (second column), z-velocity (third column), and clock bias (fourth column). The second, third, fourth, fifth, and six rows correspond to the respective impacts the second, third, fourth, fifth, and sixth Doppler measurements have on the x-velocity (first column), y-velocity (second column), z-velocity (third column), and clock bias (fourth column).

The procedure continues to step 230 and the GNSS receiver 104 determines which Doppler measurement most strongly affects each velocity state and the clock bias. Specifically, the protection level process 110 may select the maximum slope value for each velocity state and clock bias (e.g., column) from the Slopei matrix. In this example, and for the x-velocity, the protection level process 110 selects the maximum entry value of 0.341 from the first column of the Slopei matrix. As this selected slope value corresponds to the sixth Doppler measurement, which is associated with the satellite signals received from the sixth GNSS satellite 108, the protection level process 110 determines that the sixth Doppler measurement most strongly affects the x-velocity computed at the GNSS receiver 104. As such, a potential error in the sixth Doppler measurement would cause the greatest error in the x-velocity computed at the GNSS receiver 104.

The protection level process 110 also selects the maximum entry value of 0.375 from the second column, corresponding to the y-velocity, of the Slopei matrix. As this selected slope value corresponds to the fifth Doppler measurement, which is associated with the satellite signals received from the fifth GNSS satellite 108, the protection level process 110 determines that the fifth Doppler measurement most strongly affects the y-velocity computed at the GNSS receiver 104. As such, a potential error in the fifth Doppler measurement would cause the greatest error in the y-velocity computed at the GNSS receiver 104. In addition, the protection level process 110 selects the maximum entry value of 0.772 from the third column, corresponding to the z-velocity, of the Slopei matrix. As this selected slope value corresponds to the fifth Doppler measurement, which is associated with the satellite signals received from the fifth GNSS satellite, the GNSS receiver 104 determines that the fifth Doppler measurement most strongly affects the z-velocity computed at the GNSS receiver 104. As such, a potential error in the fifth Doppler measurement would cause the greatest error in the z-velocity computed at the GNSS receiver 104.

Further, the protection level process 110 may also select the maximum entry value of 0.297 from the fourth column, corresponding to the clock bias, of the Slopei matrix. As this selected slope value corresponds to the sixth Doppler measurement, which is associated with the satellite signals received from the sixth GNSS satellite, the GNSS receiver 104 determines that the sixth Doppler measurement most strongly affects the clock bias. As such, a potential error in the sixth Doppler measurement would cause the greatest error in the clock bias. Therefore, and in this example, the maximum slope values for the x-velocity, the y-velocity, z-velocity, and clock bias are respectively 0.341, 0.375, 0.772, and 0.297.

The procedure continues to step 235 and the GNSS receiver 104 selects a non-centrality parameter. Specifically, the protection level process 110 may select a non-centrality parameter from a table based on a redundancy value (e.g., number of Doppler measurements—four unknowns), where the table may be generated based on the probability of a false alert and an integrity allocation for which the protection level is desired. More specifically, the protection level process 110 may generate the table utilizing a known noncentral chi squared distribution approach, and the non-centrality parameter may represent the maximum possible error that is not detected in the velocity solution for the desired integrity allocation. In this example, the redundancy value (i.e., degrees of freedom) is two (e.g., six Doppler measurements—four unknowns). In addition, and in this example, the integrity allocation is 1e-4 (e.g., 99.9999% reliability) and the probability of a false alert is 1e-3. Based on the known noncentral chi squared distribution approach with the integrity allocation of 1e-4 and probability of a false alert of 1e-3, the protection level process 110 may generate, in a known manner, the table storing a plurality of non-centrality parameters. The GNSS receiver 104 may then index into the table utilizing the redundancy value of two to select a non-centrality parameter of 75.985.

The procedure continues to step 240 and the GNSS receiver 104 calculates a protection level for each velocity state in the earth-centered, earth-fixed (ECEF) frame based on the maximum slopes and the non-centrality parameter. Specifically, the protection level process 110 may compute the protection level for each velocity state in the ECEF frame by scaling up the maximum slopes with the selected non-centrality parameter. More specifically, the protection level process 110 multiplies each maximum slope with the square root of the selected non-centrality parameter to scale up and calculate the protection level for each velocity state. In this example, the protection level process 110 calculates the protection level for the x-velocity to be 2.972 m/s (0.341*$\sqrt{75.985}$). In addition, the protection level process 110 calculates the protection level for the y-velocity and the z-velocity to respectively be 3.269 m/s (0.375*$\sqrt{75.985}$) and 4.690 m/s (0.772*$\sqrt{75.985}$). The protection level calculated for each velocity state represents a statistical boundary for the true velocity of the GNSS receiver 104.

Figure 3A:
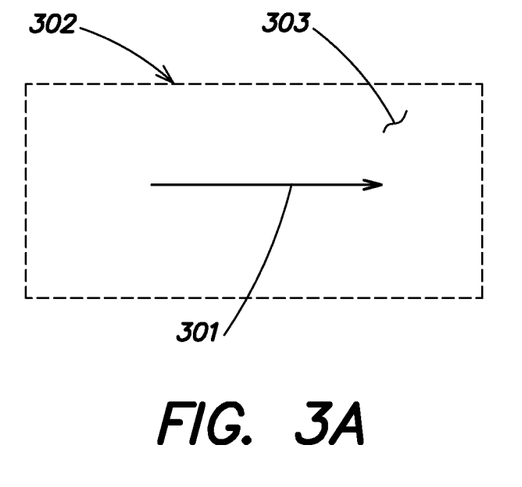
FIG. 3A is a diagram illustrating a protection level for a computed velocity according to one or more embodiments described herein.

FIG. 3A is a diagram illustrating a protection level for a computed velocity according to one or more embodiments described herein. Specifically, the computed velocity value may be represented as a velocity arrow 301 and the protection level may be represented as a geometric shape, e.g., dashed square 302, that includes the velocity arrow 301. The size of the dashed square 302, e.g., the length and height, may be equal to or representative of the calculated protection level, i.e., statistical boundary. As such, the area 303 of the dashed square 302 is guaranteed, e.g., to a particular reliability, to contain the true velocity of the GNSS receiver 104.

Accordingly, and in this example, the true x-velocity of the GNSS receiver is guaranteed, to a reliability of 99.9999%, to be ±2.972 m/s of the x-velocity computed at the GNSS receiver 104. Similarly, the true y-velocity of the GNSS receiver is guaranteed, to a reliability of 99.9999%, to be ±3.269 m/s of the y-velocity computed at the GNSS receiver 104. In addition, the true z-velocity of the GNSS receiver is guaranteed, to a reliability of 99.9999%, to be ±4.690 m/s of the z-velocity computed at the GNSS receiver 104. Advantageously, the protection levels calculated according to the one or more embodiments described herein provide a higher level of reliability (e.g., 99.9999%) in the accuracy of the computed velocity than the standard deviation 68%) that is utilized by traditional approaches.

The protection level process 110 may form a diagonal matrix, PL(XYZ) matrix, which includes the protection levels for the x-velocity, y-velocity, and z-velocity calculated in the ECEF frame. In this example, the PL(XYZ) matrix is:

$$PL(XYZ) \text{ matrix} = \begin{bmatrix} 2.972 & 0.0 & 0.0 \\ 0.0 & 3.269 & 0.0 \\ 0.0 & 0.0 & 4.690 \end{bmatrix},$$

where entry 1, 1 of the PL(XYZ) matrix corresponds to the protection level for the x-velocity, entry 2, 2 of the PL(XYZ) matrix corresponds to the protection level for the y-velocity, and entry 3, 3 of the PL(XYZ) matrix corresponds to the protection level for the z-velocity.

The procedure continues to step 245 and the GNSS receiver 104 converts the velocity protection levels calculated in the ECEF frame to north, east, up (NEU) velocity protection levels. Specifically, the protection level process 110 may compute a rotation (R) matrix based on the current position (e.g., longitude and latitude) of the GNSS receiver 104. The R matrix may be computed utilizing:

$$R \text{ matrix} = \begin{bmatrix} -\sin(Lat)*\cos(Lon) & -\sin(Lat)*\sin(Lon) & \cos(Lat) \\ -\sin(Lon) & \cos(Lat) & 0 \\ \cos(Lat)*\cos(Lon) & \cos(Lat)*\sin(Lon) & \sin(Lat) \end{bmatrix},$$

where Lat is the coordinate for the line of latitude of the GNSS receiver 104 and Lon is the coordinate for the line of longitude of the GNSS receiver 104. For this example, let it be assumed that the R matrix is:

$$R \text{ matrix} = \begin{bmatrix} 0.317124 & 0.711225 & 0.627368 \\ 0.913323 & -0.407236 & 0.000000 \\ -0.255487 & -0.572990 & 0.0778723 \end{bmatrix}$$

The GNSS receiver may then convert the protection levels to the protection levels of the NEU frame utilizing:

$$PL(NEU)^2 = R^T * PL(XYZ)^2 * R,$$

where PL(NEU) is a diagonal matrix with the protection levels of north, easting, and up, $R^T$ is the rotation matrix transposed, PL(XYZ) is the diagonal matrix with the protection levels for the x-velocity, y-velocity, and z-velocity in the ECEF frame, and R is the rotation matrix. In this example, and based on the values of the R matrix and the ECEF protection levels, the protection level process 110 calculates the north, east, and up protection levels to respectively be 3.867 m/s, 3.025 m/s, and 4.175 m/s. That is, the PL(NEU) matrix is:

$$PL(NEU) \text{ matrix} = \begin{bmatrix} 3.867 & 0.0 & 0.0 \\ 0.0 & 3.025 & 0.0 \\ 0.0 & 0.0 & 4.175 \end{bmatrix},$$

where entry 1, 1 of the PL(NEU) matrix corresponds to the protection level for the north velocity, entry 2, 2 of the PL(NEU) matrix corresponds to the protection level for the east velocity, and entry 3, 3 of the PL(NEU) matrix corresponds to the protection level for the up velocity.

The procedure continues to step 250 and the GNSS receiver 104 transforms the north and east velocity protection levels into a course over ground protection level. Specifically, the protection level process 110 may first compute the north and east velocities based on the velocities computed utilizing the least squares method (e.g., K matrix) as described herein. In this example, and based on the computed velocities, the GNSS receiver 104 computes the north velocity to be −28.741 m/s and the east velocity to be −0.776 m/s. The protection level process 110 may then compute the protection level for course over ground (PL (C.O.G)) utilizing:

$$PL(C.O.G) = \frac{\sqrt{(NorthVel^2 * PL(EastVel)^2 + EastVel^2 * PL(NorthVel)^2)}}{NorthVel^2 + EastVel^2},$$

where NorthVel is the north velocity, PL(EastVel) is the protection level for the east velocity, EastVel is the east velocity, and PL(NorthVel) is the protection level for the north velocity. In this example, and based on the values, the protection level for the computed course over ground is 6.029 degrees or 0.10523597 radians $$\left( \frac{\sqrt{((-28.741)^2 * 3.025^2 + (-0.776)^2 * 3.867^2)}}{(-28.741)^2 + (-0.776)^2} \right).$$

Figure 3B:
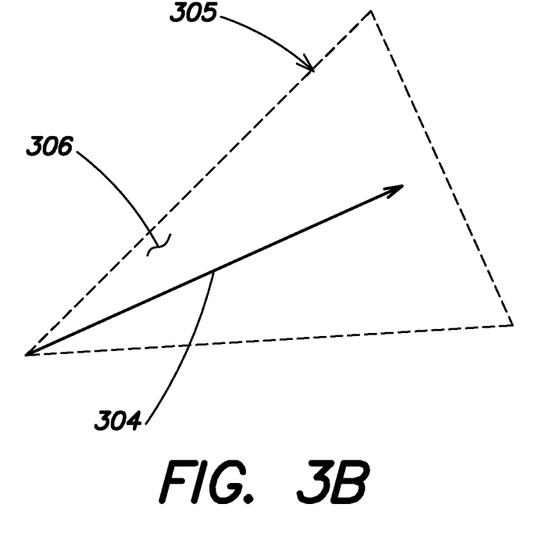
FIG. 3B is a diagram illustrating a protection level for a computed course over ground according to one or more embodiments described herein.

FIG. 3B is a diagram illustrating a protection level for a computed course over ground according to one or more embodiments described herein. Specifically, the computed course over ground value may be represented as a course over ground arrow 304 that is pointed in a particular direction with respect to, for example, true north. In addition, the protection level may be represented as a geometric shape, e.g., dashed triangle 305, that includes the course over ground arrow 304. The size of the dashed triangle 305 may be equal to or representative of the calculated protection level, i.e., statistical boundary. As such, the area 306 of the dashed triangle 305 is guaranteed, e.g., to a particular reliability, to contain the true course over ground of the GNSS receiver 104.

Accordingly, and in this example, the true course over ground of the GNSS receiver 104 is guaranteed, to a reliability of 99.9999%, to be ±6.029 degrees of the course over ground computed at the GNSS receiver 104.

The procedure continues to step 255 and the GNSS receiver transmits one or more protection levels to a sub-system 112. For example, the sub-system 112 may be an automated driving system (ADS) or an advanced driver assistance system (ADAS). As such, the GNSS receiver 104 may provide the one or more protection levels to the sub-system 112 over a wired or wireless network. In an alternative embodiment, the sub-system 112 may be external to the vehicle 102 and the GNSS receiver 104 may provide the one or more protection levels to the external sub-system 112 over a wired or wireless network.

The procedure continues to step 260 and the sub-system 112 determines if a protection level exceeds an alert limit. Specifically, the sub-system 112 compares the protection level, received from the GNSS receiver 104 and associated with the computed velocity or course over ground, with the alert limit. In an embodiment, the alert limit is a parameter of the system design and may be set at a maximum error that the sub-system 112, e.g., ADS or ADAS, can tolerate in, for example, a safety critical environment. For example, if the velocity computed at the GNSS receiver 104 is to be utilized by an automated braking sub-system that requires high precision, the alert limit may be set to 0.5 m/s, or some other accuracy value. However, if the velocity computed at the GNSS receiver 104 is to be utilized by an automated speed control sub-system, the alert limit may be set to 5 m/s, or some other accuracy value. That is, the alert limit may be based on how the value (e.g., velocity or course over ground) computed at the GNSS receiver 104 is to be utilized by the sub-system.

If at step 260 it is determined that the protection level exceeds the alert limit, the procedure continues to step 265 and the sub-system 112 determines that the value (e.g., velocity or course over ground) computed at GNSS receiver 104 cannot be utilized by the sub-system 112. For example, let it be assumed that the sub-system is an automated braking sub-system and the alert limit is 0.5 m/s. As such, and because each of the protection levels for the velocity states (3.867 m/s, 3.025 m/s, and 4.175 m/s) exceeds the alert limit of 0.5 m/s, the sub-system 112 determines that the velocity computed at the GNSS receiver 104 cannot be utilized by the sub-system 112 in, for example, a safety critical environment.

Figure 4A:
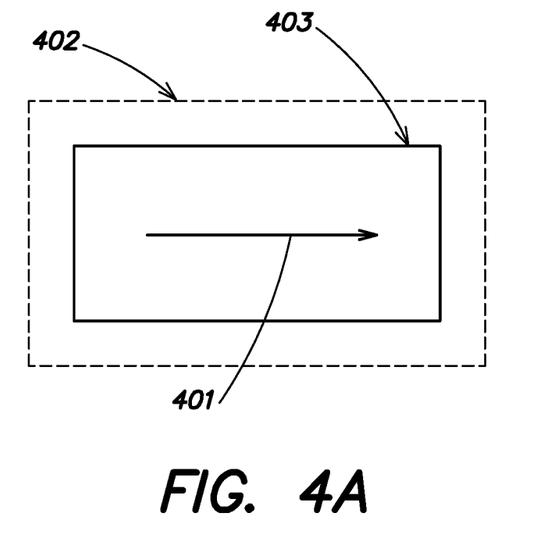
FIG. 4A is a diagram illustrating a protection level for velocity that exceeds an alert limit according to one or more embodiments described herein.

FIG. 4A is a diagram illustrating a protection level for velocity that exceeds an alert limit according to one or more embodiments described herein. Specifically, the computed velocity may be represented as a velocity arrow 401. In addition, the protection level may be represented by the dashed square 402 that has a size that is equal to or representative of the calculated protection level, i.e., statistical boundary. The solid square 403 may represent the alert limit that, for example, is the maximum error the sub-system 112, e.g., ADS or ADAS, can tolerate. As can be seen in FIG. 4A, the dashed square 402 representing the protection level exceeds the solid square 403 representing the alert limit. As such, and under this circumstance, the sub-system 112 cannot use the computed velocity. From step 265, the procedure may then continue to step 210 to repeat the sequence of steps of FIGS. 2A and 2B.

Figure 5A:
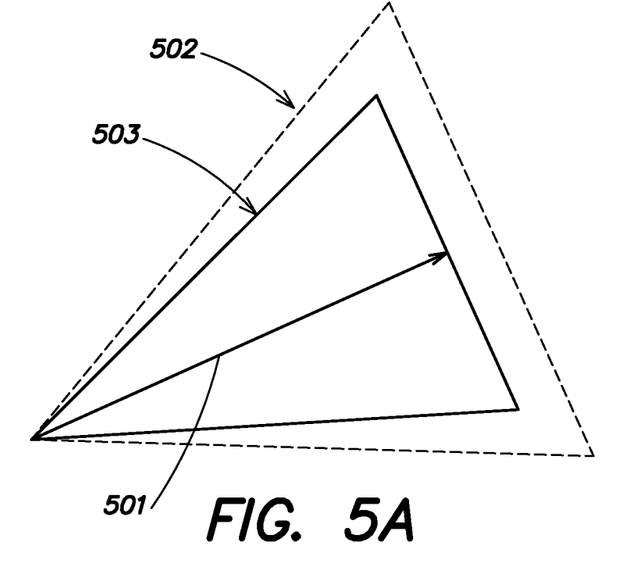
FIG. 5A is a diagram illustrating a protection level for course over ground that exceeds an alert limit according to one or more embodiments described herein.

FIG. 5A is a diagram illustrating a protection level for course over ground that exceeds an alert limit according to one or more embodiments described herein. Specifically, the computed course over ground may be represented as a course over ground arrow 501. In addition, the protection level may be represented by the dashed triangle 502 that has a size that is equal to or representative of the calculated protection level, i.e., statistical boundary. The solid triangle 503 may represent the alert limit that, for example, is the maximum error the sub-system 112, e.g., ADS or ADAS, can tolerate. As can be seen in FIG. 5A, the dashed triangle 502 representing the protection level exceeds the solid triangle 503 representing the alert limit. As such, and under this circumstance, the sub-system 112 cannot use the computed course over ground.

If at step 260 it is determined that the protection level does not exceed the alert limit, the procedure continues to step 270 and sub-system 112 determines that the value (e.g., velocity or course over ground) computed at the GNSS receiver 104 can be utilized by the sub-system 112. For example, let it be assumed that the sub-system is an automated speed control sub-system and the alert limit is 5 m/s. As such, and because each of the protection levels for the velocity states (3.867 m/s, 3.025 m/s, and 4.175 m/s) does not exceed the alert limit of 5 m/s, the sub-system 112 determines that the velocity computed at the GNSS receiver 104 can be utilized by the sub-system 112 in, for example, a safety critical environment.

Figure 4B:
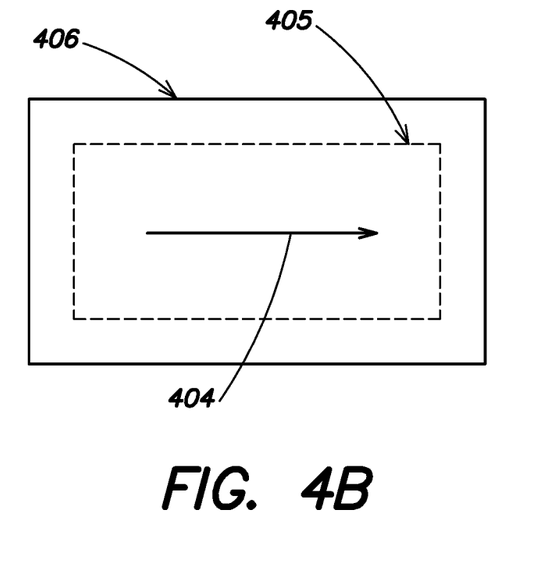
FIG. 4B is a diagram illustrating a protection level for velocity that does not exceed an alert limit according to one or more embodiments described herein.

FIG. 4B is a diagram illustrating a protection level for velocity that does not exceed an alert limit according to one or more embodiments described herein. Specifically, the computed velocity may be represented as a velocity arrow 404. In addition, the protection level may be represented by the dashed square 405 that has size that is equal to or representative of the calculated protection level. The solid square 406 may represent the alert limit that, for example, is the maximum error the sub-system 112, e.g., ADS or ADAS, can tolerate. As can be seen in FIG. 4B, the dashed square 405 representing the protection level does not exceed the solid square 406 representing the alert limit. As such, and under this circumstance, the sub-system 112 can use the computed velocity.

Figure 5B:
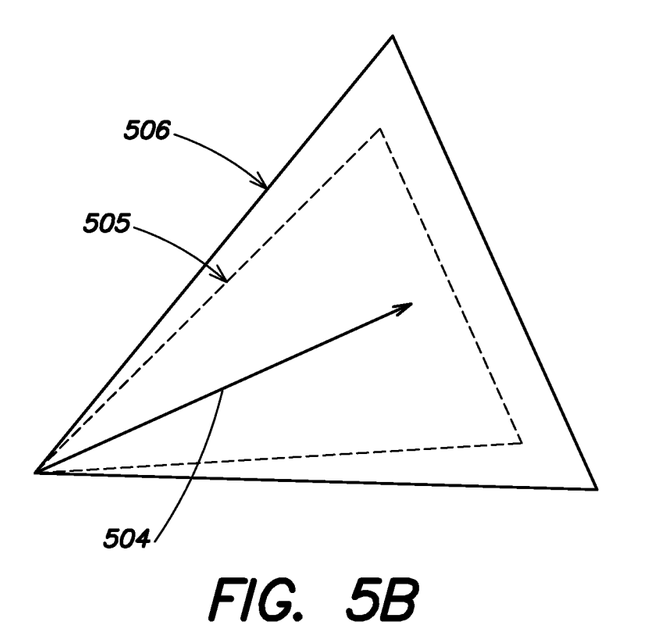
FIG. 5B is a diagram illustrating a protection level for course over ground that does not exceed an alert limit according to one or more embodiments described herein.

FIG. 5B is a diagram illustrating a protection level for course over ground that does not exceed an alert limit according to one or more embodiments described herein. Specifically, the computed course over ground may be represented as a course over ground arrow 504. In addition, the protection level may be represented by the dashed triangle 505 that has size that is equal to or representative of the calculated protection level. The solid triangle 506 may represent the alert limit that, for example, is the maximum error the sub-system 112, e.g., ADS or ADAS, can tolerate. As can be seen in FIG. 5B, the dashed triangle 505 representing the protection level does not exceed the solid triangle 506 representing the alert limit. As such, and under this circumstance, the sub-system 112 can use the computed course over ground.

From step 270, the procedure may then continue to step 210 to repeat the sequence of steps of FIGS. 2A and 2B. Advantageously, sub-systems that typically require reliability on the order of 99% or greater in the accuracy of a computed value may utilize velocity and/or course over ground when the protection levels, calculated according to the one or more embodiments described herein, do not exceed the alert limits.

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A global navigation satellite system (GNSS) receiver, comprising:
 a processor configured to:
  obtain at least five Doppler measurements based on signals received from at least five GNSS satellites;
  compute a slope for each of the at least five Doppler measurement on an x-velocity computed at the GNSS receiver;
  compute a slope for each of the at least five Doppler measurement on a y-velocity computed at the GNSS receiver;
  compute a slope for each of the at least five Doppler measurement on a z-velocity computed at the GNSS receiver;
  calculate an x-velocity protection level based on a first selected slope computed for a first selected Doppler measurement, wherein the first selected slope is a maximum computed slope for the x-velocity;
  calculate a y-velocity protection level based on a second selected slope computed for a second selected Doppler measurement, wherein the second computed slope is a maximum computed slope for the y-velocity;
  calculate a z-velocity protection level based on a third selected slope computed for a third selected Doppler measurement, wherein the third computed slope is a maximum computed slope for the z-velocity;
  calculate a north velocity protection level and an east velocity protection level in a north, east, up (NEU) frame based on at least the x-velocity protection level, the y-velocity protection level, and the z-velocity protection level; and
  transform the north velocity protection level and the east velocity protection level into a course over ground protection level.

2. The GNSS receiver of claim 1, wherein the north velocity protection level and the east velocity protection level are transformed into the course over ground protection level based on a calculation that utilizes a calculated north velocity, a calculated east velocity, the north velocity protection level, and the east velocity protection level.

3. The GNSS receiver of claim 1, wherein the processor is further configured to calculate the north velocity protection level, the east velocity protection level, and an up velocity protection level PL(NEU) using $$PL(NEU)^2 = R^T * PL(XYZ)^2 * R,$$

wherein R is a rotation matrix computed based on the location of the GNSS receiver, PL(XYZ) is a matrix including the x-velocity protection level, the y-velocity protection level, and the z-velocity protection level, and $R^T$ is the R matrix transposed.

4. The GNSS receiver of claim 3, wherein the processor is further configured to:
 compare the course over ground protection level to an alert limit;
 determine that a compared course over ground value can be utilized by a sub-system when the course over ground protection level does not exceed the alert limit; and
 determine that the computed course over ground value cannot be utilized by the sub-system when the course over ground protection level exceeds the alert limit.

5. The GNSS receiver of claim 1, wherein the processor is further configured to calculate the course over ground protection level PL(C.O.G) using:

$$PL(C.O.G) = \frac{\sqrt{(NorthVel)^2 * PL(EastVel)^2 + EastVel^2 * PL(NorthVel)^2}}{NorthVel^2 + EastVel^2},$$

wherein NorthVel is a north velocity, EastVel is an east velocity, PL(EastVel) is the east velocity protection level, and PL(NorthVel) is the north velocity protection level.

6. The GNSS receiver of claim 1, wherein the processor is further configured to:
 obtain at least five variances measurements based on the signals received from the at least five GNSS satellites;
 compute a weight matrix based on inverses of the variance measurements, wherein the weight matrix is a diagonal matrix; and
 compute a shaping matrix using direction cosines of each of the at least five GNSS satellites.

7. The GNSS receive of claim 6, wherein the processor is further configured to calculate a transformation matrix using:

$$\text{Inv}(G^T * W * G) * G^T * W * y = Ky,$$

wherein $G^T$ is the shaping matrix transposed, W is the weight matrix, G is the shaping matrix, K is the transformation matrix, and y is a Doppler measurements matrix including the at least five Doppler measurements.

8. The GNSS receiver of claim 7, wherein the slope for a particular Doppler measurement is calculated using:

$$\text{Slope}i = \text{abs}(Kji) * \sigma i / \sqrt{(1-Pii)},$$

where i represents the particular Doppler measurement, Slope$i$ is the slope of the particular Doppler measurement, K$ji$ is an entry value from the transformation matrix for the particular Doppler measurement and j state, σ$i$ is a square root of a particular variance value corresponding to the particular Doppler measurement, and P$ii$ is a diagonal entry value from a P matrix for the particular Doppler measurement, wherein the P matrix is the shaping matrix times the transformation matrix.

9. A method for calculating a protection level for a course over ground value determined at a global navigation satellite system (GNSS) receiver, the method comprising:
obtaining at least five Doppler measurements based on signals received from at least five GNSS satellites;
computing a slope for each of the at least five Doppler measurement on an x-velocity computed at the GNSS receiver;
computing a slope for each of the at least five Doppler measurement on a y-velocity computed at the GNSS receiver;
computing a slope for each of the at least five Doppler measurement on a z-velocity computed at the GNSS receiver;
calculating an x-velocity protection level based on a first selected slope computed for a first selected Doppler measurement, wherein the first selected slope is a maximum computed slope for the x-velocity;
calculating a y-velocity protection level based on a second selected slope computed for a second selected Doppler measurement, wherein the second selected slope is a maximum computed slope for the y-velocity;
calculating a z-velocity protection level based on a third selected slope computed for a third selected Doppler measurement, wherein the third selected slope is a maximum computed slope for the z-velocity;
calculating a north velocity protection level and an east velocity protection level in a north, east, up (NEU) frame based on at least x-velocity protection level, the y-velocity protection level, and the z-velocity protection level; and
transforming the north velocity protection level and the east velocity protection level into a course over ground protection level.

10. The method of claim 9, wherein the north velocity protection level and the east velocity protection level are transformed into the course over ground protection level based on a calculation that utilizes a calculated north velocity, a calculated east velocity, the north velocity protection level, and the east velocity protection level.

11. The method of claim 9, wherein the north velocity protection level, the east velocity protection level, and an up velocity protection level PL(NEU) are calculated using $$PL(NEU)^2 = R^T * PL(XYZ)^2 * R,$$

wherein R is a rotation matrix computed based on the location of the GNSS receiver, PL(XYZ) is a matrix including the x-velocity protection level, the y-velocity protection level, and the z-velocity protection level, and $R^T$ is the R matrix transposed.

12. The method of claim 10, further comprising:
comparing the course over ground protection level to an alert limit;
determining that the course over ground value can be utilized by a sub-system when the course over ground protection level does not exceed the alert limit; and
determining that the course over ground value cannot be utilized by the sub-system when the course over ground protection level exceeds the alert limit.

13. The method of claim 9, wherein the course over ground protection level PL(C.O.G) is calculated using:

$$PL(C.O.G) = \frac{\sqrt{(NorthVel)^2 * PL(EastVel)^2 + EastVel^2 * PL(NorthVel)^2)}}{NorthVel^2 + EastVel^2}$$

wherein NorthVel is a north velocity, EastVel is an east velocity, PL(EastVel) is the east velocity protection level, and PL(NorthVel) is the north velocity protection level.

14. The method of claim 10, further comprising:
obtaining at least five variances measurements based on the signals received from at least five GNSS satellites;
computing a weight matrix based on inverses of the variance measurements, wherein the weight matrix is a diagonal matrix; and
computing a shaping matrix using direction cosines of each of the at least five GNSS satellites.

15. The method of claim 14, further comprising calculating a transformation matrix using:

$$\text{Inv}(G^T * W * G) * G^T * W * y = Ky,$$

wherein $G^T$ is the shaping matrix transposed, W is the weight matrix, G is the shaping matrix, K is the transformation matrix, and y is a Doppler measurements matrix including the at least five Doppler measurements.

16. The method of claim 15, wherein the slope for a particular Doppler measurement is calculated using $$\text{Slope}i = \text{abs}(Kji) * \sigma i / \sqrt{(1 - Pii)},$$

where i represents the particular Doppler measurement, Slope$i$ is the slope of the particular Doppler measurement, K$ji$ is an entry value from the transformation matrix for the particular Doppler measurement and j state, σ$i$ is a square root of a particular variance value corresponding to the particular Doppler measurement, and P$ii$ is a diagonal entry value from a P matrix for the particular Doppler measurement, wherein the P matrix is the shaping matrix times the transformation matrix.

17. A global navigation satellite system (GNSS) receiver, comprising:
a processor configured to:
obtain at least five Doppler measurements from at least five GNSS satellites;
compute a slope for each of the at least five Doppler measurement on each of a plurality of velocity states;
calculate a north velocity protection level and an east velocity protection level form a plurality of other protection levels computed in a first frame, wherein the plurality of other protection levels are calculated based on the computed slopes, and wherein the north velocity protection level and the east velocity protection level are calculated in a second frame that is different from the first frame; and
transform the north velocity protection level and the each velocity protection level into a course over ground protection level.

18. The GNSS receiver of claim 17, wherein the plurality of velocity states include an x-velocity state, a y-velocity state, and a z-velocity state, wherein the plurality of the protection levels include an x-velocity protection level, a y-velocity protection level, and a z-velocity protection level, and wherein the first frame is an earth-centered, earth-fixed (ECEF) frame.

19. The GNSS receiver of claim 17, wherein the second frame is a north, east, up (NEU) frame.

20. The GNSS receiver of claim 17, wherein the GNSS receiver is mounted to a moving vehicle.

* * * * *